United States Patent [19]

Rainer et al.

[11] Patent Number: 5,533,258

[45] Date of Patent: Jul. 9, 1996

[54] PROCESS FOR THE MANUFACTURING OF A COOLING UNIT

[75] Inventors: Florian Rainer; Ing N. Reheis, both of Tirol, Austria

[73] Assignee: Schwarzkopf Technologies Corp., New York, N.Y.

[21] Appl. No.: 373,552

[22] Filed: Jan. 17, 1995

[30] Foreign Application Priority Data

Jan. 17, 1994 [AT] Austria ............................ 66/94

[51] Int. Cl.$^6$ .................................................. B23P 15/26
[52] U.S. Cl. .......................... 29/890.03; 29/890.038; 29/890.054; 165/168; 228/183
[58] Field of Search ............... 29/890.038, 890.03, 29/890.054; 165/168, 171, 169, 134.1, 47; 228/183, 263.12, 120, 122; 376/136, 143

[56] References Cited

U.S. PATENT DOCUMENTS

| | | | |
|---|---|---|---|
| 2,856,905 | 10/1958 | Bowen, III | 165/134.1 |
| 3,333,123 | 7/1967 | Baumann | 165/169 |
| 4,074,406 | 2/1978 | Boyd et al. | 165/168 |
| 4,134,451 | 1/1979 | Conant et al. | 165/133 |
| 4,235,279 | 11/1980 | Feuchter et al. | 165/169 |
| 4,532,101 | 7/1985 | Doll . | |
| 4,535,838 | 8/1985 | Gray et al. | 165/163 |
| 5,023,043 | 6/1991 | Kotzlowski et al. | 228/183 |

FOREIGN PATENT DOCUMENTS

| | | |
|---|---|---|
| 390688 | 6/1990 | Austria . |
| 0059960 | 9/1982 | European Pat. Off. . |

*Primary Examiner*—Irene Cuda
*Attorney, Agent, or Firm*—Morgan & Finnegan

[57] ABSTRACT

A process for the manufacture of a cooling unit particularly for fusion reactors. The cooling unit consists of one or more parts made of heat-resistant material, preferably graphite, which are joined to at least one metallic coolant conduit, preferably made of copper or a copper alloy. The joint is produced by bringing molten metal of the coolant conduit into contact with the parts made of heat-resistant material. One or more metals of the secondary groups IV and/or V of the periodic table are introduced at the contact surface between the coolant conduit and the heat-resistant parts. The metal of the coolant conduit is thereafter cooled to solidify the coolant conduit in the desired shape.

8 Claims, No Drawings

PROCESS FOR THE MANUFACTURING OF A COOLING UNIT

FIELD OF INVENTION

The invention relates to a process for the manufacture of a cooling unit, and more particularly to a process for manufacturing a cooling unit comprising at least one heat-resistant part made of graphite, ceramic or metallic material having a melting point above 1600° C. (or of composites of such materials), and at least one metallic coolant conduit joined with such parts.

BACKGROUND OF THE INVENTION

Typical examples of such cooling units are diverters and limiters for fusion reactors of the type described, for example, in DE-PS 34 16 843. In such typical cooling units, graphite is preferably used for the parts comprising heat-resistant material, such parts being connected to the coolant conduits—which preferably are made of molybdenum—by a soldered joint. For this purpose, silver-copper solders are used as the solder material. Such solders are adequately capable of withstanding the high thermal stresses acting on the soldered joint.

A disadvantage of the above-described cooling units is that only relatively expensive materials (such as molybdenum or molybdenum alloys) can be used for the coolant conduits, which preferably have walls as thin as possible for good heat transfer. The use of more favorably priced materials with good thermal conductivity, however, cause considerable problems. For example, copper or copper alloys pose a problem in that the silver-copper base solders used for soldering form a low-melting eutectic with the copper or the copper alloy, which, in the soldering process, causes the coolant conduit to start to melt, or may even lead to local dissolution of the coolant conduit in the process. With nickel-iron or nickel-iron-cobalt alloys, on the other hand, cracking of the material may occur, especially under high alternating thermal stresses, which reduces the useful life of the cooling unit.

EP-A1-59 960 relates to a cooling system for blast furnaces, wherein cast steel cooling elements are joined with steel coolant conduits by recasting the finished coolant conduits in a suitable mold with liquid steel for the cooling elements. In order to prevent the coolant conduits from melting, the coolant conduits are provided on the surface with a coating comprising ceramics or zirconium.

U.S. Pat. No. 4,532,101 describes a limiter element with three sections for a fusion reactor. The individual sections consist of a rigid supporting part, on which several graphite plates are mechanically fastened, such plates being coated with titanium carbide. The supporting part is made of stainless steel and is also soldered to the coolant conduit which is made from a steel alloy.

SUMMARY OF THE INVENTION

Therefore, an object of the present invention is to create a process for the manufacture of a cooling unit that permits the use of the coolant conduits, and which results in a connection between the parts made of heat-resistant material and the coolant conduits that is capable of withstanding the high thermal stresses occurring during operation (particularly in the presence of cyclic stresses) without the development of any significant damaging material cracks.

According to the invention, this and other objects are accomplished by bringing the metal of the coolant conduit in the molten liquid state into contact with the heat-resistant parts, so that during the joining process, components of one or more metals of the secondary groups IV and/or V of the periodic table of elements are present within the zone of contact. The metal of the coolant conduit is subsequently solidified in the desired shape by cooling.

The foregoing specific object and advantage of the invention is illustrative of those which can be achieved by the present invention and are not intended to be exhaustive or limiting of the possible advantages which can be realized. Thus, this and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

DETAILED DESCRIPTION OF THE INVENTION

The present invention describes a process for manufacturing a cooling unit which typically includes parts made of heat-resistant material and at least one metallic coolant conduit. According to the present invention, an excellent joint is obtained between the parts made of heat-resistant material and the metallic coolant conduit. The presence of components of at least one metal of the secondary group IV (titanium, zirconium, hafnium) and/or of the secondary group V (vanadium, niobium, tantalum) within the zone of contact or the zone of the joint assures excellent wetting of the parts made of heat-resistant material with the melt of the metal of the coolant conduit. Since the coolant conduit is, according to the invention, shaped by solidifying the melt in the desired form, the problem associated with the solder causing the coolant conduit to start alloying with such solder—such a problem would occur when the coolant conduits are soldered to the parts comprising heat-resistant material—is completely avoided.

By way of example, graphite, beryllium, and also ceramic materials such as SiC, TiC, $TiB_2$ and $B_4C$ are suitable materials for the heat-resistant parts. Materials such as copper and copper alloys, and also iron alloys, nickel cast alloys and steel alloys are suitable for the coolant conduit.

The one or more metals of the secondary groups IV and/or V can be incorporated, for example, in the form of an intermediate layer between the contact surfaces of the parts made of high-melting metal and the metallic coolant conduits.

The intermediate layer can be produced by coating one or both of the materials to be joined, but also by arranging it in the form of a foil. Suitable coating techniques are, for example, galvanic processes, and also CVD- and PVD-methods. It has been found that a thickness in the range of 10 and 50 μm is suitable for the intermediate layer.

Also, it is conceivable that the metal(s) of the secondary groups IV and/or V is or are already present as alloying elements in the metal of the coolant conduit. This is particularly advantageous if the metallic coolant conduits are manufactured by abutting the parts made of heat-resistant material, using suitable casting equipment.

It has been found that it is especially advantageous if titanium is used as the metal of the secondary group IV, which assures particularly good wetting of the high-melting parts by the molten metal of the coolant conduit.

Furthermore, it is advantageous to incorporate the metal(s) of the secondary groups IV and/or V in the form of a foil between the parts made of heat-resistant material and the still-solid metallic coolant conduits, and to subsequently heat the whole composite structure until the coolant conduit is liquefied. A foil thickness of between 10 and 50 μm has been found to be suitable in this case. The thin metal foil is dissolved by the melt of the metal of the coolant conduit within a short time, and the alloy so produced wets and infiltrates the contact surfaces of the heat-resistant parts. Following solidification of the alloy for the coolant conduit in the desired final shape, a solid, stable and material-locked joint is obtained between the coolant conduit and the parts made of high-melting material.

The process according to the invention has been proved to be particularly advantageous when CFC-graphite is used as material for the high-temperature resistant parts, and when copper or a copper alloy is used for the coolant conduits.

A particularly good joint is obtained between the parts comprising thermally resistant material and the metallic coolant conduits if the parts made of heat-resistant material are, on their contact surface with the metallic coolant conduits, structured by bores, which are preferably produced by laser.

The invention is further explained in the following example of manufacture.

EXAMPLE

A "single tube" diverter for fusion reactors is produced as follows:

A prismatic part comprising fiber-reinforced graphite and having the dimensions 175×40×36 mm is provided with a bore of 16 mm diameter extending therethrough in the longitudinal direction. Subsequently, the surface of the bore is roughed up by producing—by laser—bores of about 100 μm diameter extending perpendicularly to the surface. Following cleaning of the graphite part, the graphite part is annealed under vacuum for 60 minutes at 1200° C.

The surface of the bore is completely lined with a titanium foil of 20 μm thickness. Subsequently, a copper tube with 1 mm wall thickness, which was cleaned by ultrasound, is inserted in the bore, resting form-locked against the titanium foil. A form-locking graphite core is pushed into the interior of the copper tube. The arrangement is centered and fixed on a base plate and, under vacuum, isothermally heated to 1150° C. in an inductively heated furnace. Following a dwelling time of about 20 minutes, the induction coil is moved from the heating zone by motor in order to permit a controlled directed solidification. Following cooling and removal from the induction installation, the inner graphite core is bored out.

The diverter so produced was tested by nondestructive test methods (ultrasound test, X-ray radiography, leakage test, pressure test). No defects of any type were found.

The marginal zone of the copper tube bordering on the graphite was developed as a titanium carbide layer.

The diverter so produced was subjected to a thermomechanical, cyclic stress test. The diverter was heated under high vacuum to 600° C. during a heating period of 1 minute and subsequently cooled to room temperature in the course of 15 minutes. After 100 cycles, a nondestructive and a destructive testing of the diverter showed the flawless state of the joint of the heat-resistant graphite part with the copper tube.

The invention has been explained in greater detail in the above example of a heat shield for fusion reactors; however, without being limited to such an application in any way. The invention can also be used for other cooling systems such as, for example, cooled drawing matrices for manufacturing profiled rods, cooled electrodes for melt electrolysis and the like.

Furthermore, the application of the invention is not in any way limited to certain geometric embodiments. In particular, the embodiment of the coolant conduits is not limited to cylindrical tubes. Moreover, one or more parts made of heat-resistant material can be completely or only partially joined with one or more metallic coolant conduits.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

What is claimed is:

1. A process for the manufacture of a cooling unit comprised of at least one heat-resistant part made of material having a melting point above 1600° C., and at least one metallic coolant conduit joined with said part, said process comprising the steps of: bringing said heat-resistant part into contact with molten metal of said coolant conduit; introducing molten components of at least one metal of secondary groups IV and V of the periodic table within a zone of contact surface between said coolant conduit and said heat-resistant part; and cooling the metal of said coolant conduit to solidify said coolant conduit in a desired shape.

2. A process for the manufacture of a cooling unit according to claim 1, wherein said heat-resistant part is made of graphite, ceramic or metallic material.

3. A process for the manufacture of a cooling unit according to claim 1, wherein said heat resistant part is made of composites of graphite, ceramic or metallic material.

4. A process for the manufacture of a cooling unit according to claim 1, wherein the metal of the secondary group IV is titanium.

5. A process for the manufacture of a cooling unit according to claim 1, further comprising the steps of: placing said at least one metal of secondary groups IV and V in the form of a foil between the contact surface of said heat-resistant part and the still-solid metallic coolant conduit; and subsequently heating the total composite material until said coolant conduit and said foil are liquefied.

6. A process for the manufacture of a cooling unit according to claim 1, wherein said heat-resistant material is CFC-graphite and the metal of said coolant conduit is copper or a copper alloy.

7. A process for the manufacture of a cooling unit according to claim 4, wherein said heat-resistant material is CFC-graphite and the metal of said coolant conduit is copper or a copper alloy.

8. A process for the manufacture of a cooling unit according to claim 1, further comprising the step of forming bores on the contact surface of said heat-resistant part.

\* \* \* \* \*